US006899389B2

(12) United States Patent
Saccucci

(10) Patent No.: US 6,899,389 B2
(45) Date of Patent: May 31, 2005

(54) BICYCLE SEAT ASSEMBLY

(75) Inventor: Darcy Saccucci, Coquitlam (CA)

(73) Assignee: MacNeil Bikes, Inc., Burnaby (*) Notice: Subject to any disclaimer, the term of this patent is extended or adjusted under 35 U.S.C. 154(b) by 0 days.

(21) Appl. No.: 10/655,241

(22) Filed: Sep. 3, 2003

(65) Prior Publication Data

US 2005/0046247 A1 Mar. 3, 2005

(51) Int. Cl.[7] .................................................. B62J 1/00
(52) U.S. Cl. ........................... 297/215.15; 297/215.14; 297/195.1
(58) Field of Search ............................. 297/195.1, 201, 297/202, 215.13, 215.14, 215.15, 215.16

(56) References Cited

U.S. PATENT DOCUMENTS

| | | | | |
|---|---|---|---|---|
| 584,637 | A * | 6/1897 | Jarvis | 297/202 |
| 623,238 | A * | 4/1899 | Davis | 297/200 |
| 1,957,405 | A | 10/1934 | Pryate | 208/15 |
| 3,992,054 | A | 11/1976 | Campagnolo | 297/195 |
| 4,155,590 | A * | 5/1979 | Cunningham | 297/215.15 |
| 4,568,121 | A | 2/1986 | Kashima | 297/195 |
| 4,877,286 | A * | 10/1989 | Hobson et al. | 297/215.13 |
| 5,244,301 | A | 9/1993 | Kurke et al. | 403/390 |
| 5,465,634 | A | 11/1995 | Chen | 74/551.3 |
| 5,823,618 | A | 10/1998 | Fox et al. | 297/201 |
| 5,921,624 | A * | 7/1999 | Wu | 297/215.14 |
| 5,979,978 | A | 11/1999 | Olsen et al. | 297/215.15 |
| 6,702,376 | B1 * | 3/2004 | Shen | 297/215.15 |

FOREIGN PATENT DOCUMENTS

| | | |
|---|---|---|
| DE | 4312457 | 10/1994 |

* cited by examiner

*Primary Examiner*—Peter R. Brown
(74) *Attorney, Agent, or Firm*—William L Paradice, III

(57) ABSTRACT

A bicycle seat assembly includes a tubular seat post having an upper serrated surface, a threaded aperture formed in the upper serrated surface and aligned with a longitudinal axis of the tubular seat post, a saddle support structure having a lower serrated surface adapted to mate with the upper serrated portion of the tubular seat post, the lower serrated portion including a slot through which a bolt can extend and mate with the threaded aperture, and a saddle adapted to mate with an upper surface of the saddle support, the saddle having a opening formed therein that allows access to the bolt through a top surface of the saddle.

40 Claims, 8 Drawing Sheets

BICYCLE SEAT ASSEMBLY

FIELD OF INVENTION

This invention relates generally to bicycles and specifically to seats for bicycles.

BACKGROUND

As the popularity of bicycles increases, manufacturers and riders have sought to make bicycles that are stronger and more light-weight. Indeed, reducing the weight of a bicycle without comprising its strength can provide a rider with a competitive advantage. One area in which manufacturers have recently focused on to reduce bicycle weight is the seat, the seat post, and the assembly that connects the seat to the seat post.

Many popular seat designs include a seat post, upper and lower clamping members, a fastener, two parallel support rods, and a saddle. The upper and lower clamping members are attached to the seat post with the fasteners, and are adapted to clamp the two parallel support rods, which in turn are attached to a bottom portion of the saddle. Examples of such bicycle seat designs are disclosed in U.S. Pat. Nos. 5,244,301, 5,823,618, and 5,979,978, all of which are incorporated by reference herein. Although popular, these seat designs include a large number of parts, which not only results in the seat assembly being relatively heavy but also results in increased equipment and labor costs. In addition, because the fastening bolts used to attach the upper and lower clamping members to the parallel support rods are typically accessed from underneath the seat saddle, assembly can be cumbersome.

Other seat assemblies have been proposed that eliminate the parallel support bars and fasteners discussed above. For example, U.S. Pat. No. 4,568,121, which is incorporated by reference herein, includes a seat post having a serrated concave portion that mates with a convex serrated portion attached to the bicycle seat. However, the bolt that attaches the seat post to the seat is accessible only from beneath the seat, and is therefore somewhat cumbersome to attach or remove the seat from the seat post. In addition, the bolt is not aligned with the seat post, and therefore is exposed to lateral moments that can weaken the bolt and reduce the strength and durability of the seat assembly with use.

Thus, there is a need for a bicycle seat assembly that has a minimum number of parts, is light-weigh yet very strong and durable, and which allows for faster and more convenient assembly and disassembly.

BRIEF DESCRIPTION OF THE DRAWINGS

The features and advantages of the present invention are illustrated by way of example and are by no means intended to limit the scope of the present invention to the particular embodiments shown, and in which.

Like reference numerals refer to corresponding parts throughout the drawing figures.

DETAILED DESCRIPTION

Figure 1:
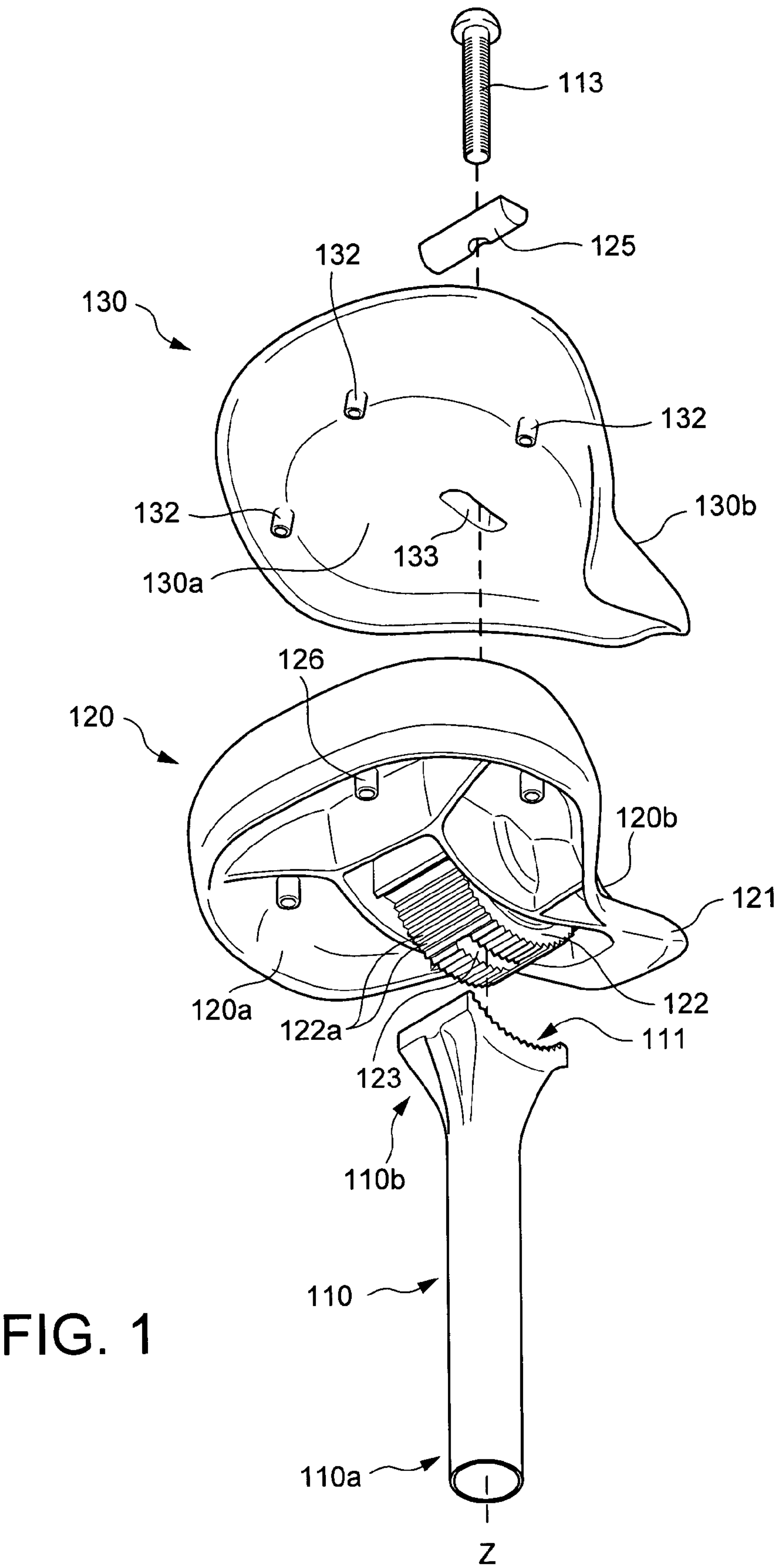
FIG. 1 is an exploded isometric view of a seat assembly in accordance with the present invention.
Figure 2:
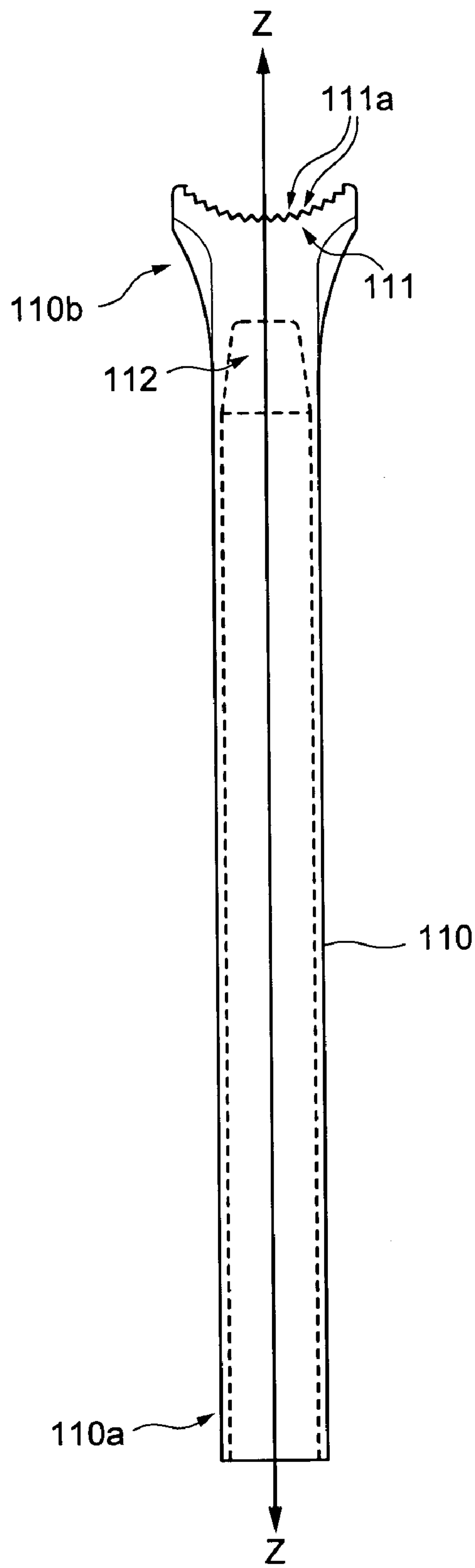
FIG. 2 is a side plan view of the seat post of the seat assembly of FIG. 1.
Figure 3:
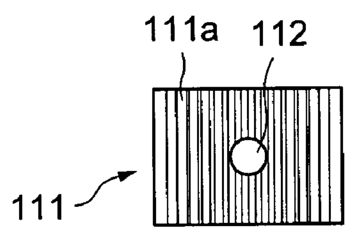
FIG. 3 is a top plan view of the seat post of the seat assembly of FIG. 1.
Figure 4A:
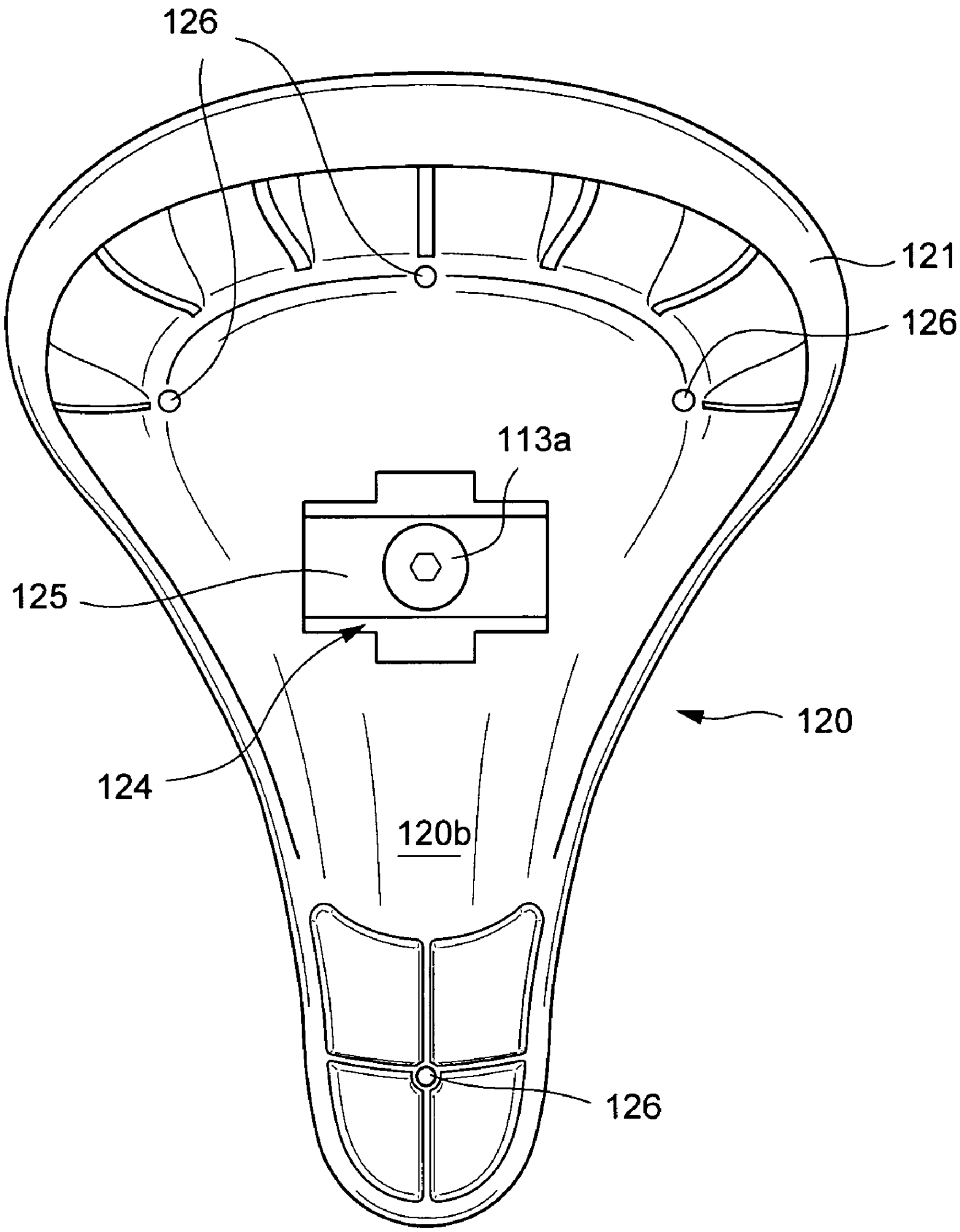
FIG. 4A is a top plan view of the saddle support structure of the seat assembly of FIG. 1.
Figure 4B:
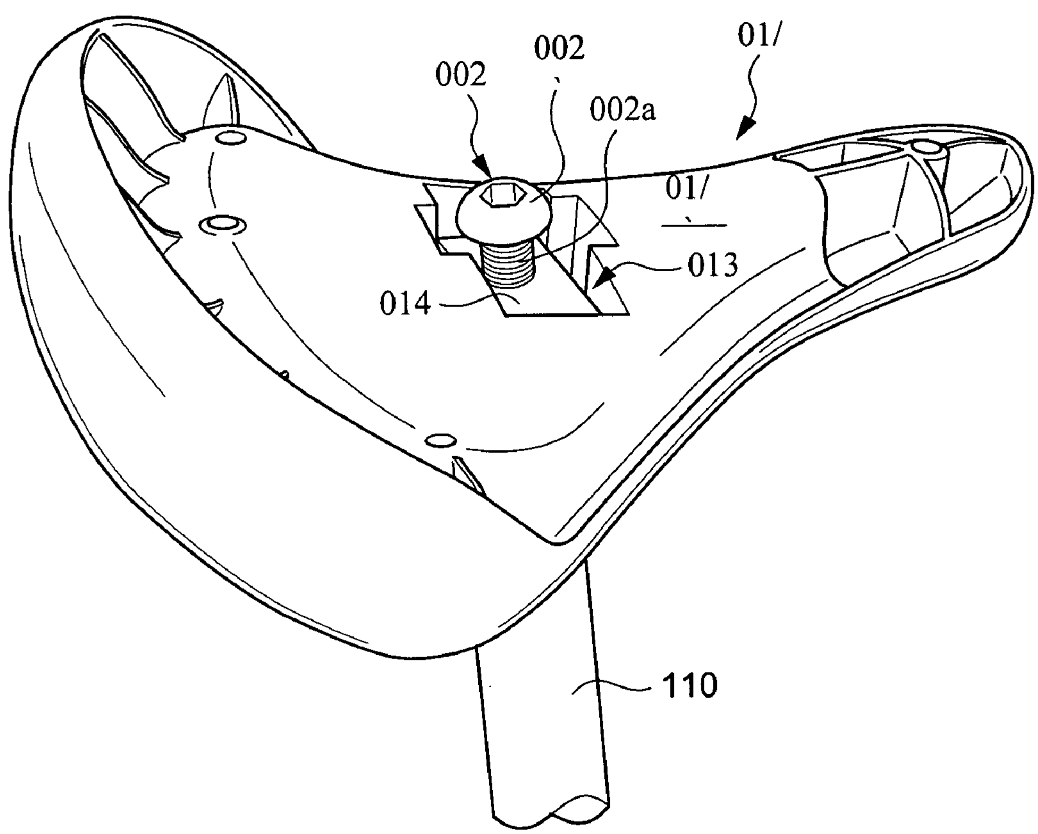
FIG. 4B is a side perspective view of the saddle support structure of the seat assembly of FIG. 1.
Figure 5:
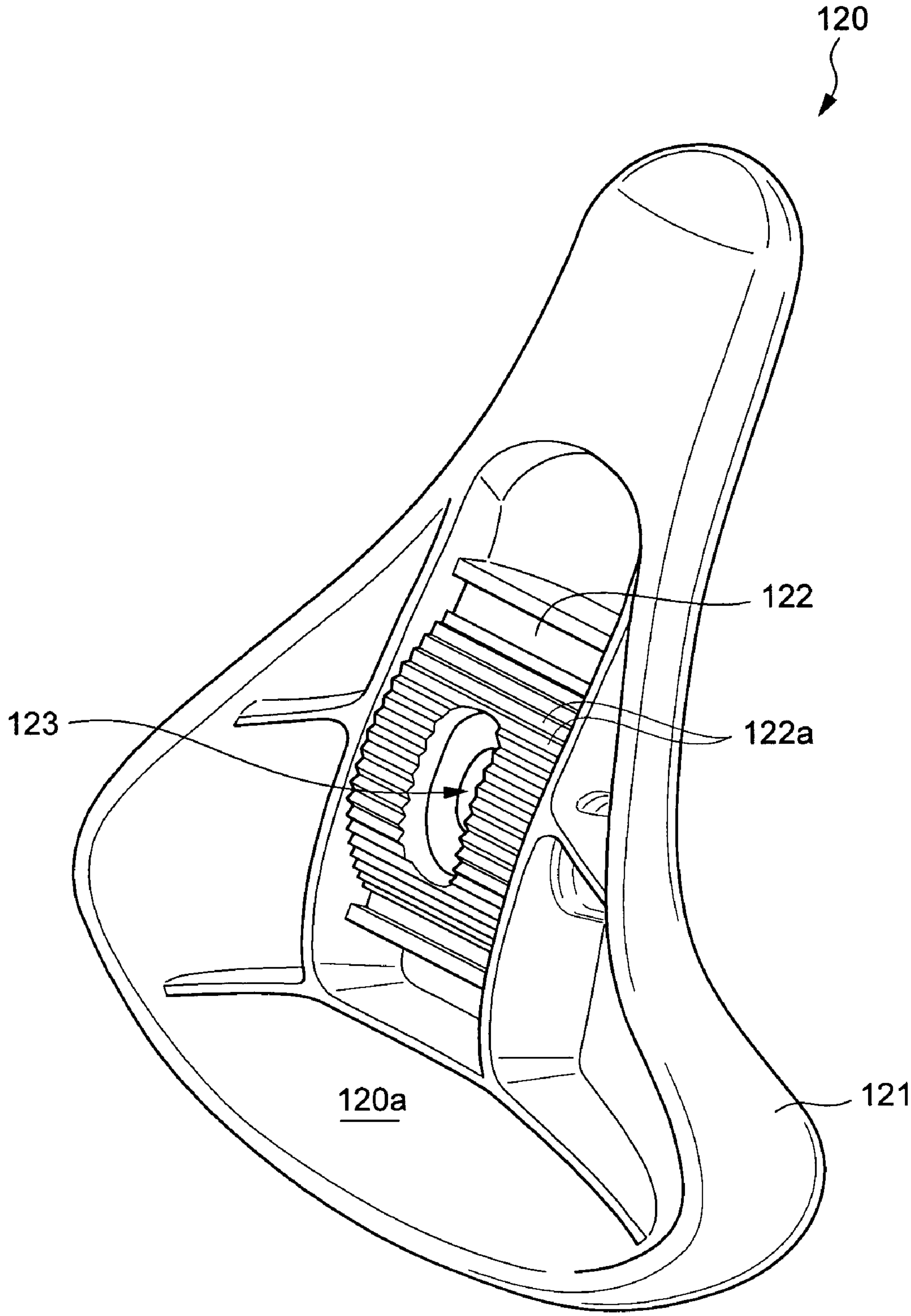
FIG. 5 is a bottom perspective view of the saddle support structure of the seat assembly of FIG. 1.

A bicycle seat assembly is described below that includes a fewer number of parts and weighs less than prior art bicycle seat assemblies without sacrificing strength or durability. Furthermore, the seat assembly of the present invention allows for faster and more convenient assembly and disassembly.

FIGS. 1–7 show a bicycle seat assembly 100 in accordance with one embodiment of the present invention. Seat assembly 100 includes a tubular seat post 110, a saddle support structure 120, and a saddle 130. Seat post 110 is characterized by a longitudinal axis Z extending through a central hollowed portion thereof, and includes a lower portion 110*a* adapted to be inserted into the seat post tube of an associated bicycle frame (not shown for simplicity), and an upper portion 110*b* adapted to mate with the saddle support structure 120. The upper seat post portion 110*b* widens to form a concave serrated surface 111 having a plurality of grooves 111*a* formed therein. For some embodiments, the grooves 111*a* formed on the upper serrated surface 111 are perpendicular to the longitudinal axis Z of the seat post 110. A threaded aperture 112 is formed in a central portion of the concave serrated surface 111 so as to align with the longitudinal axis Z of the seat post. The threaded aperture 112 is adapted to receive a bolt 113 having a threaded stem 113*a* and a head 113*a*. The threaded stem 113*a* is fitted to screw into the threaded aperture 112. When inserted into the threaded aperture, the bolt 113 has a co-axial relationship with the threaded aperture 112 and the seat post 110.

The seat post 110 can be made from any strong, durable, and lightweight material including, for example, a composite material, aluminum, alloys, titanium, or other materials, and can be of any dimensions suitable for use with a bicycle. For some embodiments, seat post 110 is aluminum forged using a 3-D fabrication process, although other fabrication methods can be used. For one embodiment, the seat post 110 has an outer diameter of approximately 2.5 cm, a wall thickness of approximately 3 mm, and a length of between approximately 20–25 cm, although for other embodiments seat post 110 can have other suitable dimensions. The cross-sectional shape of the seat post 110 can be any suitable shape that allows it to be inserted into the seat post tube of a bicycle. For some embodiments, the cross-sectional shape of the seat post 110 is circular, as illustrated in the figures. For other embodiments, the cross-sectional shape of the seat post 110 can be rectangular, elliptical, triangular, octagonal, or some other suitable shape.

Further, the concave serrated surface 111 can have any number of grooves 11*a* formed therein, and can be of any suitable width and length. For some embodiments, the upper serrated surface 111 includes 14 grooves 111*a*, with the grooves 111*a* being approximately 3.5 cm long and spaced approximately 3 mm apart.

Saddle support structure 120 has a lower surface 120*a* and an upper surface 120*b* having a shape defined by an outer wall 121. A mating member 122 is attached to the lower surface 120*a* of the saddle support structure 120. The mating member 122 has a convex serrated surface including a plurality of grooves 122*a* that are adapted to mate with corresponding grooves 111*a* formed in the upper serrated surface 111 of the seat post 110, thereby preventing slipping between the seat post 110 and the saddle support structure 120 when the saddle support structure 120 is in contact with and secured to the seat post 110 via the bolt 113. For some embodiments, the mating member 122 is longer and includes more grooves 122*a* than the concave serrated surface 111 of the seat post 110 so that the saddle structure 120 can be rotated with respect to the seat post 110 to provide seat angle adjustments. Thus, for some embodiments, the grooves 111*a* formed in the seat post 110 can mate with any number of subsets of grooves 122*a* formed in the mating member 122 to adjust the relative angular positions of the seat post 110 and the saddle 130.

The mating member 122 and the saddle support structure 120 can be any suitable material. For some embodiments, the saddle support structure 120 is a composite plastic and/or resin material formed by injection molding, and the mating member is a composite material, alloy, metal, titanium, aluminum, or other rigid material formed using any well-known tooling process. The mating member 122 can be attached to the lower surface 120*a* of the saddle support structure 120 using any well-known technique. For some embodiments in which the saddle support structure 120 is a plastic material, the mating member 122 is attached thereto using well-known adhesive techniques such as gluing, bonding, and the like. For other embodiments in which saddle support structure 120 is a metallic material, the mating member 122 can be welded thereto. For still other embodiments, the mating member 122 can be formed as an integral (e.g., non-removable) part of the saddle support structure 120. For one embodiment, the mating member 122 is made of aluminum and is secured to support structure 120 via the bolt 113.

The mating member 122 has a slot 123 formed therein through which the bolt 113 can extend into the seat post 110. For some embodiments, the slot 123 is much longer than the diameter of the bolt 113 so that the mating member 122 and support structure 120 can be rotated into a plurality of positions with respect to the upper serrated surface 111 of the seat post 110, thereby allowing for seat angle adjustments. For one embodiment, the slot 123 is approximately 3 cm long and approximately 1 cm wide, although slot 123 can have other dimensions. An arcuate recess 124 is formed in the top surface 120*b* of the saddle support structure 120. The recess 124 includes an aperture aligned with the slot 123 formed in the mating member 122, and is adapted to receive a similarly shaped washer 125 through which the bolt stem 113*b* but not the bolt head 113*a* can extend. Washer 125 and bolt 113 can be formed of any suitable rigid and durable material. For one embodiment, the washer 125 and bolt 113 are formed of aluminum, although other materials can be used. For one embodiment, the bolt stem 113*b* is approximately 55 mm long and has a diameter of approximately 8 mm, and the bolt head 113*a* is approximately 18 mm wide and configured for use with a 5 mm allen wrench.

Saddle 130 has a lower surface 130*a*, an upper surface 130*b*, and a suitable cushioning material (not shown for simplicity) disposed therebetween. The upper surface 130*b*, onto which a rider sits, is a cover material such as vinyl or leather, although other suitable materials can be used. The lower surface of the saddle 130 can be any suitable rigid material. For some embodiments, the lower saddle surface 120*b* is made of a plastic and/or resin composite. For other embodiments, a metallic material such as an alloy, aluminum, titanium, and the like can be used. The lower saddle surface 130*a* is adapted to mate with the saddle support upper surface 120*b* such that saddle 130 securely rests within the saddle support structure 120.

The saddle's lower surface 130*a* can be attached to the saddle support structure 120 using any suitable technique. For some embodiments, a plurality of pegs 132 extending from the lower saddle surface 130*a* are received into corresponding recesses 126 formed in the saddle support structure's top surface 120*b*. The pegs 132 can be secured to corresponding recesses 126 using any suitable adhesive. For some embodiments, the saddle seat 130 can be attached to the saddle support structure 120 using gluing or bonding techniques. For other embodiments, the saddle seat 130 and support structure 120 can be fabricated as an integrated component.

Figure 6:
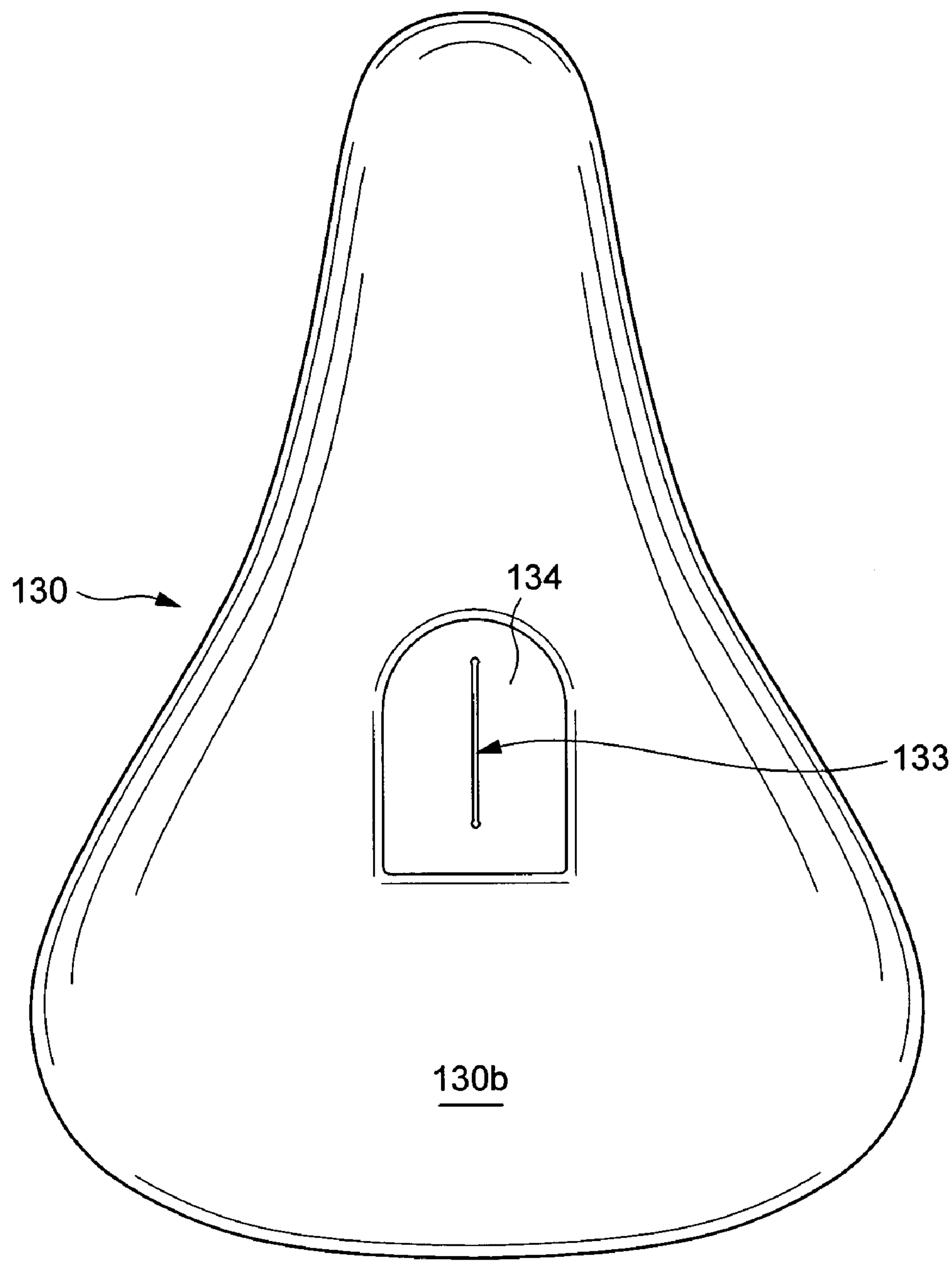
FIG. 6 is a top plan view of the saddle of the seat assembly of FIG. 1.
Figure 7:
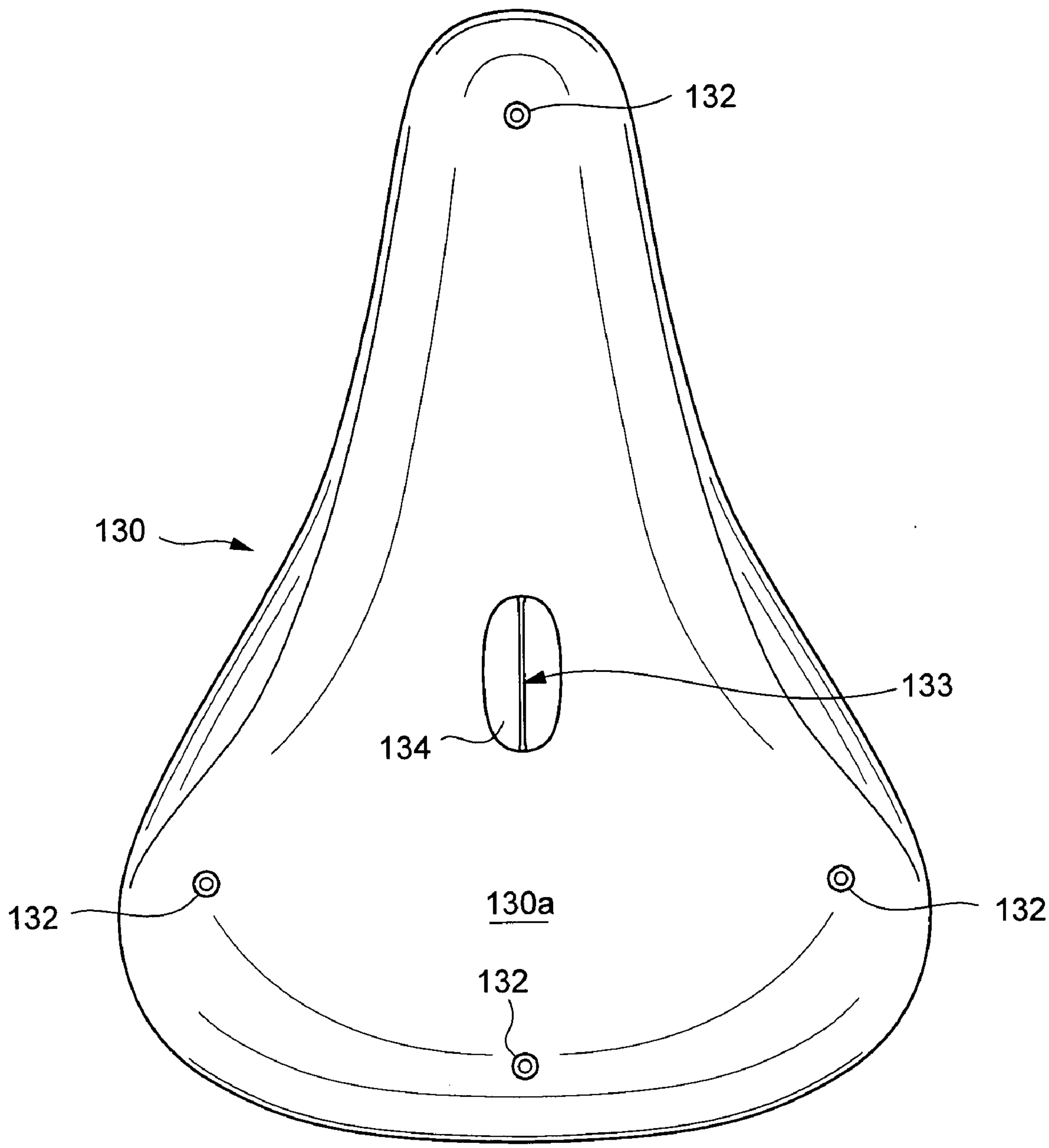
FIG. 7 is a bottom plan view of the saddle of the seat assembly of FIG. 1.

In accordance with the present invention, an opening 133 is formed in the saddle 130 through which the bolt 113 can be inserted and/or accessed to facilitate the attachment of saddle support structure 120 and saddle 130 to seat post 110, as well as to facilitate the removal of saddle 130 and support 120 from the seat post 110. In this manner, the opening 133 in the saddle 130 allows a rider to quickly and easily attach or remove the saddle 130 and support structure 120 from the seat post 110, or to sufficiently loosen the bolt 113 adjust the seat angle. For some embodiments, the opening 133 in the saddle's cover surface 130*b* is a slit formed in a panel 134 provided in the cover material 130*b*, as shown in FIGS. 6–7. The panel 134, which is made of a flexible material (e.g., rubber and the like) that is adapted to allow an elongated wrench (e.g., an allen wrench) to be inserted through the saddle 130 to engage bolt head 113*a*, substantially covers the opening 133 when in its natural state (e.g., when a wrench is not inserted through the panel). For some embodiments, the panel 134 can be eliminated, and the opening 133 can extend through the saddle cover material 130*b*. For other embodiments, the opening 133 can be any other suitable shape.

For example, a rider can easily adjust the angle of saddle 130 with respect to the bicycle (not shown) by simply inserting an elongated wrench (not shown) through the slit 133 in the saddle 130 to engage the bolt head 113*a*, loosening the bolt 113 until the bolt 113 disengages from the threaded aperture 112 in the seat post 110, re-positioning the support structure 120 with respect to the seat post 110 to achieve the desired seat angle, and then tightening the bolt 113 until the saddle 130 and support structure 120 are securely attached to the seat post 110. This is in marked contrast to prior art seat assemblies in which the fastening bolts are accessible only from beneath the seat assembly, which makes seat angle adjustments cumbersome.

For other embodiments, the slit 133 formed in the saddle 130 may be of other suitable shapes and/or sizes that allow access to the bolt 133 through (e.g., from above) the saddle 130. For one embodiment, the slit 133 is simply a hole formed in the saddle 130 through which the bolt 133 can be inserted into and/or removed from the threaded aperture 112 in the seat post 110.

Further, when screwed into the threaded aperture 112 in the seat post 110 through the slot 123 in the saddle support structure 120, the bolt 113 is aligned with the longitudinal axis Z of the seat post 110, which in turn maximizes the strength and durability of the seat assembly 100 because the bolt 113 is not exposed to any lateral moments (e.g., forces) during use. This is in marked contrast to the structures disclosed in U.S. Pat. Nos. 4,568,121, 5,244,301, and 5,823,618 in which the fastening bolt is not aligned with the seat post and is therefore undesirably exposed to lateral moments that can cause failure of the fastening bolt.

In addition, the seat assembly 100 of the present invention includes a minimum number of parts, which advantageously reduces manufacturing costs as well as labor costs associated with assembling the seat assembly 100. For example, reducing the labor costs associated with assembling seat assembly 100 allows a bicycle shop or manufacturer to build more seat assemblies 100 in less time, which in turn can advantageously reduce overhead and make the seat assembly 100 of the present invention a more attractive bicycle component than prior seat assemblies. Also, the minimum number of parts for seat assembly 100 also minimizes the weight of seat assembly 100, which can provide riders a competitive advantage. For one embodiment described herein, seat assembly 100 weighs approximately 1 pound.

Figure 8:
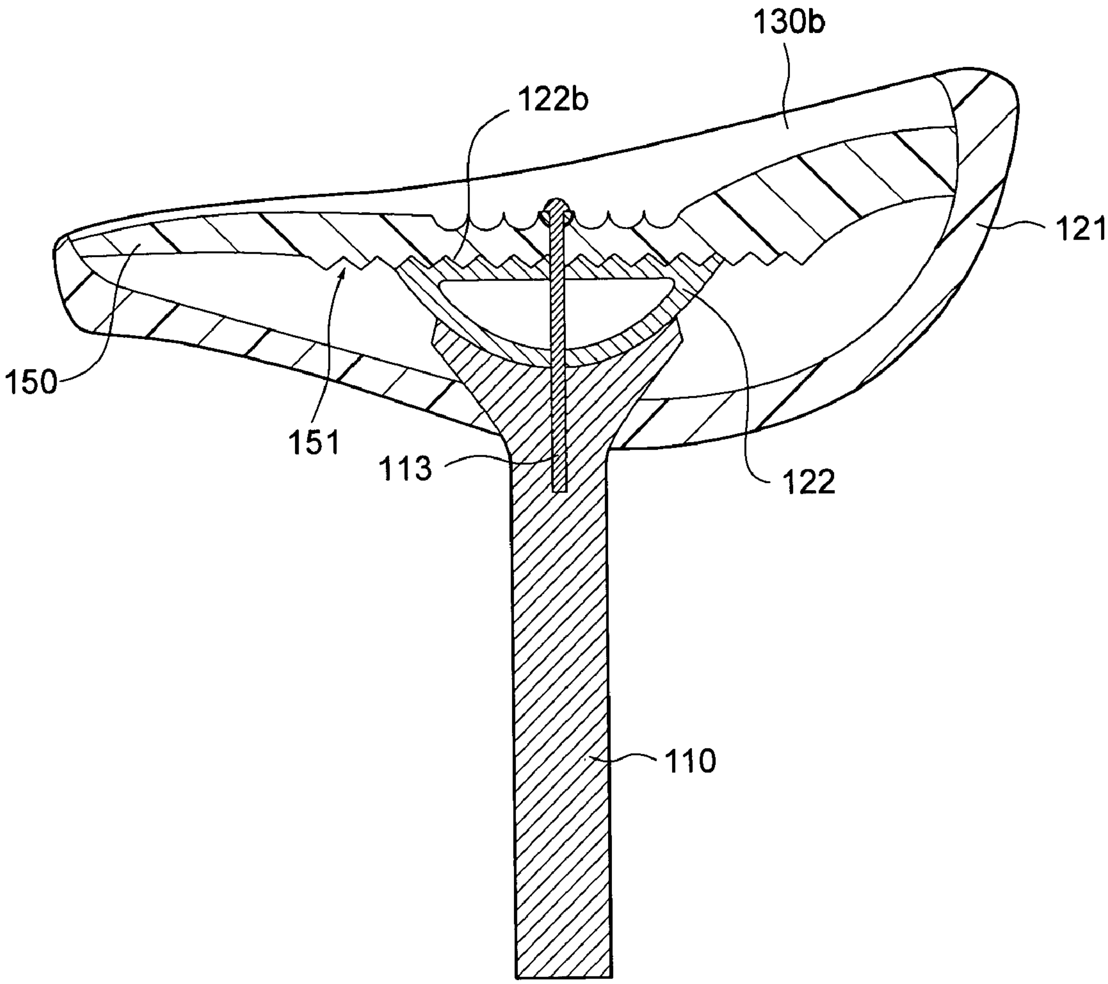
FIG. 8 is a side view of the saddle support structure in accordance with another embodiment of the present invention.

For other embodiments of the present invention, the saddle support structure 120 can include a horizontally oriented mating member 150 having a plurality of grooves 151 formed in a lower surface thereof that are adapted to mate with corresponding grooves **122*b* formed on a substantially planer (e.g., horizontal) top surface of a modified mating member 122, as illustrated in FIG. 8. The mating member 150 can be made of any suitable rigid and durable material, and can be attached to the saddle support structure 120 in any suitable manner. For such embodiments, mating member 122 is not fixedly attached to saddle support structure 120. For some embodiments, mating members 122 and 150** are made of the same material.

Mating member 150 has many more grooves 151 than grooves **122*b* formed on the top surface of mating member 122 so that the relative horizontal positions of mating members 122 and 150 can be adjusted by sliding mating member 122 with respect to mating member 150 such that grooves 122*b* of mating member 122 can mate with any number of subsets of grooves 151 in mating member 150. In this manner, the relative horizontal positions of the saddle 130 and the seat post 110 can be adjusted to bring the saddle 130 forward or backward, e.g., to bring the saddle 130 closer to or further from the associated bicycle's handle bars (not shown for simplicity). The ability to adjust the saddle 130 to various forward/backward positions is desirable to accommodate riders of different sizes and/or to accommodate different riding styles. For such embodiments, the slot 123 and opening 133 are sufficiently elongated such that the bolt 113 and the seat post 110 remain in a coaxial relationship, irrespective of the relative forward/backward position of the saddle 130 with respect to the seat post 110. In addition, as described above, the ability to access the bolt 113 through saddle 130** allows for quick and easy seat adjustments.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention. For one example, in other embodiments, the upper portion of the seat post can have a convex serrated surface and the saddle support structure's mating member can have a concave serrated surface. For another example, the upper surface of the seat post and the lower surface of the saddle structure's mating member are not serrated, e.g., their grooves are eliminated. Additionally, the shape of the saddle shown in the accompanying figures is merely illustrative; for other embodiments, the saddle can have other shapes.

What is claimed is:

1. A bicycle seat assembly, comprising:

a tubular seat post characterized by a longitudinal axis and having a threaded aperture formed therein along the longitudinal axis;

a saddle support structure adapted to mate with the seat post;

a bolt having a head adapted to engage the saddle support structure and having a threaded stem adapted to extend into the threaded aperture in the seat post via a slot formed in the saddle support structure; and a saddle attached to an upper surface of the saddle support structure, the saddle having an slit formed therein through which the head of the bolt can be accessed.

2. The seat assembly of claim 1, further comprising a panel formed in a top surface of the saddle, wherein the panel comprises the slit.

3. The seat assembly of claim 2, wherein the panel comprises a flexible material adapted to allow the bolt to be inserted through the saddle.

4. The seat assembly of claim 1, wherein the bolt and the seat post are coaxial.

5. The seat assembly of claim 1, wherein the saddle support structure is adapted to mate with the seat post in a plurality of different positions to provide a corresponding plurality of angles between the saddle and the seat post.

6. The seat assembly of claim 1, wherein the saddle support structure is adapted to mate with the seat post in a plurality of different positions to adjust the horizontal position of the saddle with respect to the seat post.

7. The seat assembly of claim 1, wherein the saddle support structure further comprises:

an arcuate recess formed in the saddle support structure, the arcuate recess aligned with the slot and having a washer situated therein through which the bolt stem but not the bolt head can extend.

8. The seat assembly of claim 1, further comprising:

a plurality of first grooves formed on a top surface of the seat post; and a plurality of second grooves formed on a bottom surface of the saddle support structure, the first and second grooves adapted to mate with each other.

9. The seat assembly of claim 8, wherein the top surface of the seat post is concave and the bottom surface of the saddle support structure is convex.

10. The seat assembly of claim 8, wherein the top surface of the seat post is convex and the bottom surface of the saddle support structure is concave.

11. The seat assembly of claim 1, wherein the saddle support structure includes a plurality of recesses adapted to mate with a corresponding plurality of pegs extending from a bottom surface of the saddle.

12. A bicycle seat assembly, comprising:

a tubular seat post having an upper surface;

a threaded aperture formed in the upper surface of the seat post, the threaded aperture extending into an interior portion of the seat post;

a saddle support structure having a lower surface adapted to mate with the upper surface of the seat post and including a slot through which a bolt can extend and mate with the threaded aperture;

a saddle adapted to mate with an upper surface of the saddle support structure; and an slit formed in the saddle, the slit adapted to allow access to a head of the bolt through the saddle.

13. The seat assembly of claim 12, further comprising a panel formed in a top surface of the saddle, wherein the panel comprises the slit.

14. The seat assembly of claim 13, wherein the panel comprises a flexible material adapted to allow an elongated wrench to be inserted through the saddle to access the bolt.

15. The seat assembly of claim 12, wherein the bolt can be inserted through the slot and into the threaded aperture via the slit in the saddle.

16. The seat assembly of claim 12, wherein the threaded aperture extends along a longitudinal axis of the seat post.

17. The seat assembly of claim 12, wherein the bolt, the slit, and the threaded aperture are coaxial.

18. The seat assembly of claim 12, wherein the upper surface of the seat post and the lower surface of the saddle support structure each comprise a plurality of grooves adapted to mate with each other.

19. The seat assembly of claim 12, wherein the upper surface of the seat post is convex and the lower surface of the saddle support structure is concave.

20. The seat assembly of claim 12, wherein the upper surface of the seat post is concave and the lower surface of the saddle support structure is convex.

21. The seat assembly of claim 12, wherein the saddle support structure includes a recess aligned with the slot and having a washer situated therein through which a stem of the bolt but not the head of the bolt can extend.

22. The seat assembly of claim 12, wherein the saddle support structure includes a plurality of recesses adapted to mate with a corresponding plurality of pegs extending from a bottom surface of the saddle.

23. The seat assembly of claim 12, wherein the slot is elongated to allow the saddle support structure to mate with the seat post in a plurality of relative angular positions.

24. The seat assembly of claim 12, wherein the saddle support structure and the saddle comprise non-detachable portions of an integrated component.

25. A bicycle seat assembly, comprising:

a tubular seat post having an upper surface and characterized by a longitudinal axis;

a threaded aperture formed in the seat post;

a saddle support structure having a lower surface adapted to mate with the upper surface of the seat post in a plurality of different positions, the saddle support structure having a slot formed therein;

a bolt having a threaded stem adapted to extend through the slot and into the threaded aperture of the seat post to removably attach the saddle support structure to the seat post; and a saddle mounted on an upper surface of the saddle support structure, the saddle having an slit formed therein through which a head of the bolt can be accessed.

26. The seat assembly of claim 25, further comprising a panel formed in a top surface of the saddle, wherein the panel comprises the slit.

27. The seat assembly of claim 26, wherein the panel comprises a flexible material.

28. The seat assembly of claim 25, wherein the slit is adapted to allow an elongated wrench to be inserted through the saddle to access the head of the bolt.

29. The seat assembly of claim 25, wherein the threaded aperture is aligned with the longitudinal axis of the seat post.

30. The seat assembly of claim 25, wherein the bolt is aligned with the longitudinal axis of the seat post.

31. The seat assembly of claim 25, wherein the upper surface of the seat post includes a plurality of first grooves and the lower surface of the support structure includes a plurality of second grooves adapted to mate with the first grooves.

32. A bicycle seat assembly, comprising:

a tubular seat post characterized by a longitudinal axis and having a curved upper surface;

a threaded aperture formed in the seat post;

a first mating member having a curved lower surface adapted to mate with the curved upper surface of the seat post in a plurality of relative angular positions, the first mating member having a substantially horizontal upper surface;

a second mating member having a substantially horizontal lower surface adapted to mate with the substantially horizontal upper surface of the first mating member in a plurality of relative horizontal positions;

a saddle support structure having a lower surface adapted to mate with an upper surface of the second mating member, the saddle support structure having a slot formed therein;

a bolt having a head adapted to mate with the slot and having a threaded stem adapted to extend through the slot and into the threaded aperture of the seat post to removably attach the saddle support structure to the seat post; and a saddle mounted on an upper surface of the saddle support structure, the saddle having an opening formed therein through which the bolt can be accessed.

33. The seat assembly of claim 32, wherein the opening comprises a slit.

34. The seat assembly of claim 33, further comprising a panel formed in a top surface of the saddle, wherein the panel comprises the slit.

35. The seat assembly of claim 32, wherein the threaded aperture extends along the longitudinal axis of the seat post.

36. The seat assembly of claim 32, wherein the bolt is aligned with the longitudinal axis of the seat post.

37. The seat assembly of claim 32, wherein the upper curved surface of the seat post includes a plurality of first grooves adapted to mate with a selected subset of a plurality of second grooves formed in the lower curved surface of the first mating member.

38. The seat assembly of claim 37, wherein the upper curved surface of the seat post comprises a concave surface and the lower curved surface of the first mating member comprises a convex surface.

39. The seat assembly of claim 37, wherein the upper curved surface of the seat post comprises a convex surface and the lower curved surface of the first mating member comprises a concave surface.

40. The seat assembly of claim 37, wherein the upper surface of the first mating member includes a plurality of third grooves adapted to mate with a selected subset of a plurality of fourth grooves formed in the lower surface of the second mating member.

* * * * *